United States Patent
Carroll

(10) Patent No.: US 6,574,916 B1
(45) Date of Patent: Jun. 10, 2003

(54) PLANT GRAFTING SYSTEM

(76) Inventor: Harmon Carroll, 5013 37th Ave. N., St Petersburg, FL (US) 33710

( * ) Notice: Subject to any disclaimer, the term of this patent is extended or adjusted under 35 U.S.C. 154(b) by 0 days.

(21) Appl. No.: 10/045,286

(22) Filed: Nov. 7, 2001

(51) Int. Cl.[7] .................................................. A01G 1/06
(52) U.S. Cl. ........................ 47/6; 47/1.01 R; 47/1.01 P
(58) Field of Search ......................... 47/1.01 R, 1.01 P, 47/6; 30/279.2, 279.4

(56) References Cited

U.S. PATENT DOCUMENTS 6,148,560 A * 11/2000 Hagen et al. ..................... 47/6

FOREIGN PATENT DOCUMENTS

| CH | 149019 | * | 8/1931 |
| FR | 1230786 | * | 9/1960 |
| FR | 2293869 | * | 8/1976 |
| JP | 6-292457 | * | 10/1994 |
| JP | 11-168975 | * | 6/1999 |
| JP | 2000-41484 | * | 2/2000 |
| SU | 1576034 A | * | 7/1990 |

* cited by examiner

Primary Examiner—Peter M. Poon
Assistant Examiner—Jeffrey L. Gellner

(57) ABSTRACT

A plant grafting system comprises a cutter assembly. The cutter assembly has a pair of V-shaped upper razors and a pair of V-shaped lower razors. A holder/insertion assembly is provided. The holder/insertion assembly is laterally spaced from the cutter assembly. The holder/insertion assembly has blocks and clamps for retaining the lower portion of an upper plant and the upper portion of a lower plant with respect to the razors. Next provided is a first drive to move the cutter assembly and razors for cutting a V-shaped recess in the upper portion of the lower plant and a V-shaped projection in the lower portion of the upper plant. Further provided is a second drive. The second drive causes relative movement between the V-shaped projection and the V-shaped recess to cause frictional contact there between.

1 Claim, 5 Drawing Sheets

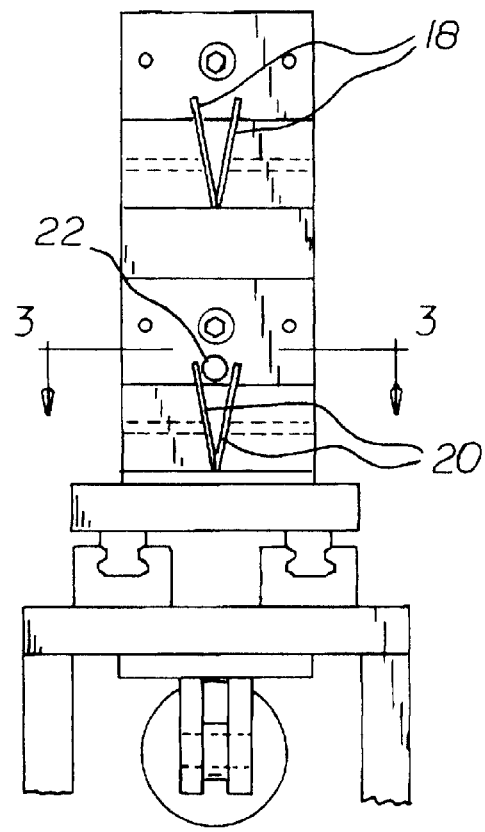
FIG 2
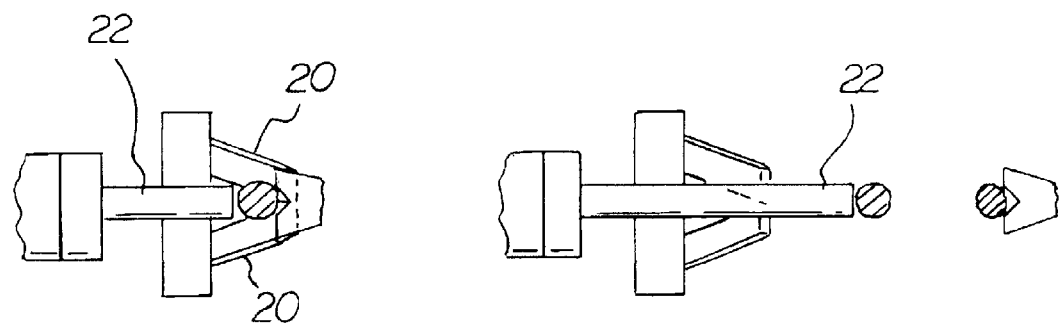
FIG 3
FIG 3A

PLANT GRAFTING SYSTEM

BACKGROUND OF THE INVENTION

1. Field of the Invention

The present invention relates to a plant grafting system and more particularly pertains to automatically coupling the upper portion of a lower plant with the lower portion of an upper plant in a safe and efficient manner.

2. Description of the Prior Art

The use of grafting devices of known designs and configurations is known in the prior art. More specifically, grafting devices of known designs and configurations previously devised and utilized for the purpose of grafting plants through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,969,843 to Wahl, et al discloses a device for grafting grapevines. U.S. Pat. No. 4,014,132 to Cook discloses a method and apparatus for horticultural grafting. U.S. Pat. No. 4,154,020 to Paz, et al. discloses a process for the propagation of rose plants. U.S. Pat. No. 4,654,999 to Raggett discloses a cuttinc device. U.S. Pat. No. 4,769,944 to Fresne et al. discloses a grafting machine. U.S. Pat. No. 4,839,986 to Grantham discloses a grafting apparatus. U.S. Pat. No. 5,099,600 to Crawford et al. discloses a paraffin wax grafting technique and apparatus. U.S. Pat. No. 5,209,011 to Mori et al. discloses an apparatus for grafting immature plants. U.S. Pat. No. 5,444,938 to Pissenberger discloses a device for vee- grafting. Lastly, U.S. Pat. No. 6,148,560 to Hagen et al. discloses a grafting machine.

While these devices fulfill their respective, particular objectives and requirements, the aforementioned patents do not describe a plant grafting system that allows automatically coupling the upper portion of a lower plant with the lower portion of an upper plant in a safe and efficient manner.

In this respect, the plant grafting system according to the present invention substantially departs from the conventional concepts and designs of the prior art, and in doing so provides an apparatus primarily developed for the purpose of automatically coupling the upper portion of a lower plant with the lower portion of an upper plant in a safe and efficient manner.

Therefore, it can be appreciated that there exists a continuing need for a new and improved plant grafting system which can be used for automatically coupling the upper portion of a lower plant with the lower portion of an upper plant in a safe and efficient manner. In this regard, the present invention substantially fulfills this need.

SUMMARY OF THE INVENTION

In view of the foregoing disadvantages inherent in the known types of grafting devices of known designs and configurations now present in the prior art, the present invention provides an improved plant grafting system. As such, the general purpose of the present invention, which will be described subsequently in greater detail, is to provide a new and improved plant grafting system and method which has all the advantages of the prior art and none of the disadvantages.

To attain this, the present invention essentially comprises a work table. The work table has an upper horizontal surface for the receipt and retention of various components of the system. Next provided is a cutter assembly. The cutter assembly is positioned on the work surface. The cutter assembly has a cutter support. The cutter support has a pair of V-shaped upper razors. The cutter support also has a pair of V-shaped lower razors. The cutter support further has a spring-biased retention finger. The retention finger extends forwardly through a space between the lower razors. A holder/insertion assembly is provided next. The holder/insertion assembly is positioned on the work surface laterally spaced from the cutter assembly. An operational space is defined there between. The holder assembly includes an upper block. The upper block has an associated upper clamp. The upper clamp retains the lower portion of the upper plant. The upper clamp is laterally spaced from the upper razors. A lower block is provided. The lower block has an associated lower clamp. The lower clamp is provided beneath the upper block and upper clamp for holding the upper portion of the lower plant. An intermediate block is provided between the upper and lower block laterally spaced from the lower razors. An intermediate member is provided to locate the ends of the plants with respect to the blocks and razors. Provided next is a first horizontal drive cylinder. The first horizontal drive cylinder is provided to move the cutter assembly and razors laterally between a rest position and a cutting position. The drive cylinder is provided adjacent to the upper support and intermediate support. The drive cylinder is provided for cutting a V-shaped recess in the upper portion of the lower plant. The drive cylinder is also provided for cutting a V-shaped projection in the lower portion of the upper plant. The drive cylinder further provides for the advancement of the retention finger. In this manner a central portion of the lower plant is clamped into contact with the lower support prior to cutting. The first horizontal drive cylinder is further adapted to retract the cutting assembly away from the blocks after cutting. A second horizontal drive cylinder is provided. The drive cylinder is provided to laterally shift the intermediate block between a rest location between the upper and lower blocks for cutting of the plants and a remote location laterally offset from the rest position for coupling of the plants. A vertical drive cylinder is provided to move the upper block and clamp between a raised position for cutting of the plant and a lowered position whereby the V-shaped projection of the upper plant is in frictional contact with and retained by the V-shaped recess in the upper portion of the lower plant. A pneumatic activator is provided. The activator is positioned with respect to the intermediate block. In this manner a flow of pressurized air is provided to eject the uppermost portion of the lower plant from the central support after cutting. Provided next is an upper clamp drive. The upper clamp moves the upper clamp between a locking location adjacent to the upper block for holding the upper plant prior to and during a cut and an unlocking location remote from the upper block after grafting. Further provided is a lower clamp drive. The lower clamp drive moves the lower clamp between a locking location and an unlocking location. The locking location is adjacent to the intermediate block for holding the lower plant prior to and during a cut. The unlocking location is remote from the intermediate block after grafting. Last provided is a control assembly. The control assembly includes first button. This button drives the upper clamp drive and the upper clamp from the unlocking position to the locking position. A second button is provided. The second button drives the lower clamp drive and the lower clamp from the unlocking position and locking position. Also provided are third and fourth buttons to be depressed simultaneously to sequentially and automatically drive the first horizontal drive cylinder and the cutter assembly between the rest position and the cutting position, then to drive the second horizontal drive cylinder and the intermediate block between a rest location and a remote location, and then to drive the vertical drive cylinder and the upper block and clamp between a raised position and a lowered position, and finally to engage the pneumatic activator.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant grafting system which has all of the advantages of the prior art grafting devices of known designs and configurations and none of the disadvantages.

It is another object of the present invention to provide a new and improved plant grafting system which may be easily and efficiently manufactured and marketed.

It is further an object of the present invention to provide a new and improved plant grafting system which is of durable and reliable constructions.

An even further object of the present invention is to provide a new and improved plant grafting system which is susceptible of a low cost of manufacture with regard to both materials and labor, and which accordingly is then susceptible of low prices of sale to the consuming public, thereby making such plant grafting system economically available to the buying public.

Even still another object of the present invention is to provide a plant grafting system for automatically coupling the upper portion of a lower plant with the lower portion of an upper plant in a safe and efficient manner.

Lastly, it is an object of the present invention to provide a new and improved plant grafting system comprising a cutter assembly. The cutter assembly has a pair of V-shaped upper razors and a pair of V-shaped lower razors. A holder/insertion assembly is provided. The holder/insertion assembly is laterally spaced from the cutter assembly. The holder/insertion assembly has blocks and clamps for retaining the lower portion of an upper plant and the upper portion of a lower plant with respect to the razors. Next provided is a first drive to move the cutter assembly and razors for cutting a V-shaped recess in the upper portion of the lower plant and a V-shaped projection in the lower portion of the upper plant. Further provided is a second drive. The second drive causes relative movement between the V-shaped projection and the V-shaped recess to cause frictional contact there between.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross-sectional view taken along line 2—2 of FIG. 1.

FIG. 3 is a cross-sectional view taken along line 3—3 of Figure showing the finger in a retracted position.

FIG. 3A cross-sectional view taken along line 3—3 of FIG. 2 showing the finger in an extended position.

The same reference numerals refer to the same parts throughout the various Figures.

DESCRIPTION OF THE PREFERRED EMBODIMENT

Figure 1:
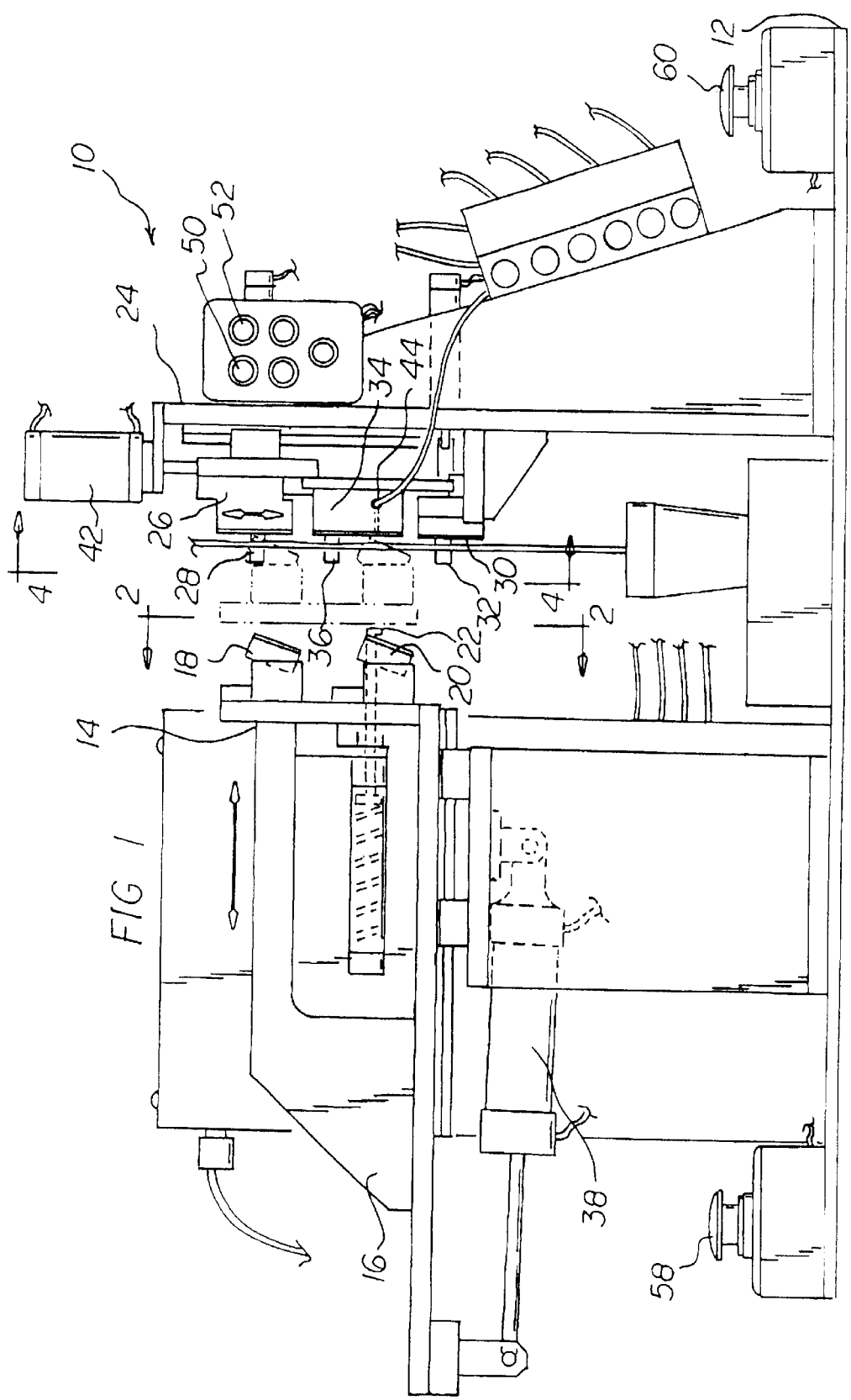
FIG. 1 is a front elevational view of a plant grafting system constructed in accordance with the principles of the present invention.

With reference now to the drawings, and in particular to FIG. 1 thereof, the preferred embodiment of the new and improved plant grafting system embodying the principles and concepts of the present invention and generally designated by the reference numeral 10 will be described.

The present invention, the plant grafting system 10 is comprised of a plurality of components. Such components in their broadest context include a cutter assembly 14, a holder/insertion assembly 24, a first drive and a second drive. Such components are individually configured and correlated with respect to each other so as to attain the desired objective.

First provided is a work table 12. The work table has an upper horizontal surface for the receipt and retention of various components of the system.

Next provided is a cutter assembly 14. The cutter assembly is positioned on the work surface. The cutter assembly has a cutter support 16. The cutter support has a pair of V-shaped upper razors 18. The c utter support also has a pair of V-shaped lower razors 20. The cutter support further has a spring-biased retention finger 22. The retention finger extends forwardly through a space between the lower razors. Note FIGS. 2, 3 and 3A.

A holder/insertion assembly 24 is provided next. The holder/insertion assembly is positioned on the work surface laterally spaced from the cutter assembly. An operational space is defined there between. The holder assembly includes an upper block 26. The upper block has an associated upper clamp 28. The upper clamp retains the lower portion of the upper plant. The upper clamp is laterally spaced from the upper razors. A lower block 30 is provided. The lower block has an associated lower clamp 32. The lower clamp is provided beneath the upper block and upper clamp for holding the upper portion of the lower plant. An intermediate block 34 is provided between the upper and lower block laterally spaced from the lower razors. An intermediate member 36 is provided to locate the ends of the plants with respect to the blocks and razors.

Provided next is a first horizontal drive cylinder 38. The first horizontal drive cylinder is provided to move the cutter assembly and razors laterally between a rest position and a cutting position. The first horizontal drive cylinder moves the cutter support is provided. The drive cylinder is provided for cutting a V-shaped recess in the upper portion of the lower plant. The first horizontal drive cylinder is also provided for cutting a V-shaped projection in the lower portion of the upper plant. The drive cylinder further provides for the advancement of the retention finger. In this manner a central portion of the lower plant is clamped into contact with the central support, the intermediate block, prior to cutting. The first horizontal drive cylinder is further adapted to retract the cutting assembly away from the blocks after cutting.

A second horizontal drive cylinder 40 is provided. The drive cylinder is provided to laterally shift the intermediate block 34, FIG. 4, between a rest location between the upper and lower blocks for cutting of the plants and a remote location, FIG. 5, laterally offset from the rest position for coupling of the plants.

Figure 4:
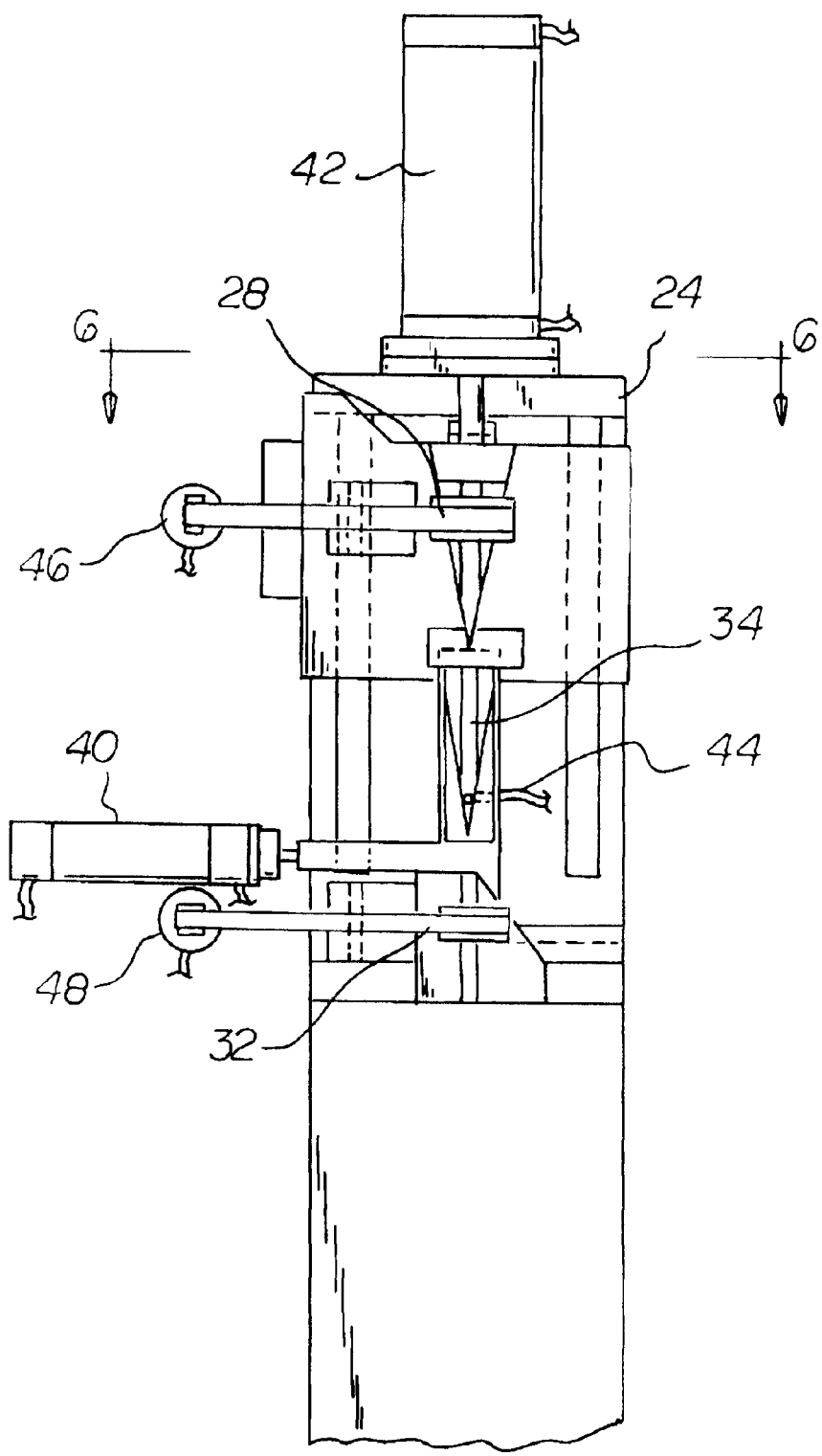
FIG. 4 is a view taken along line 4—4 of FIG. 1.
Figure 5:
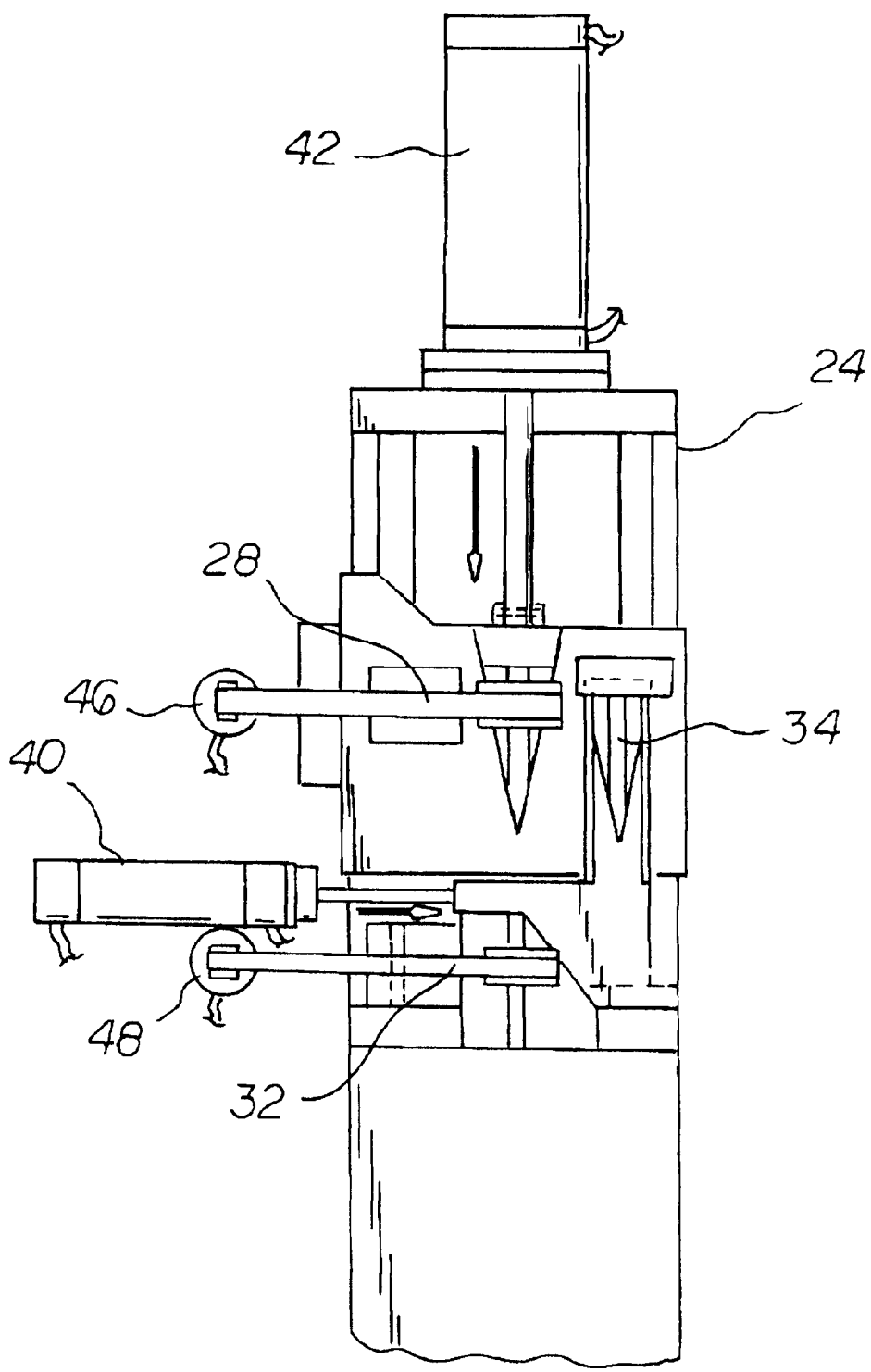
FIG. 5 is a view similar to FIG. 4, but showing the intermediate block in the laterally shifted position and the upper block and clamp in the raised position.

A vertical drive cylinder 42 is provided to move the upper block and clamp between a raised position, FIGS. 1 and 4, for cutting of the plant and a lowered position, FIG. 5, whereby the V-shaped projection of the upper plant is in frictional contact with and retained by the V-shaped recess in the upper portion of the lower plant. Note the University of Florida, Florida Cooperative Extension Service, Circular 1098, Jun. 1994, Gadenias by Kathleen C. Ruppert and Joan Bradshaw.

A pneumatic activator 44 is provided to generate an air blast. The activator is positioned with respect to the intermediate block. In this manner a flow of pressurized air is provided to eject the uppermost portion of the lower plant from the central support after cutting.

Provided next is an upper clamp drive 46. The upper clamp moves the upper clamp 28 between a locking location adjacent to the upper block for holding the upper plant prior to and during a cut and an unlocking location remote from the upper block after grafting.

Figure 6:
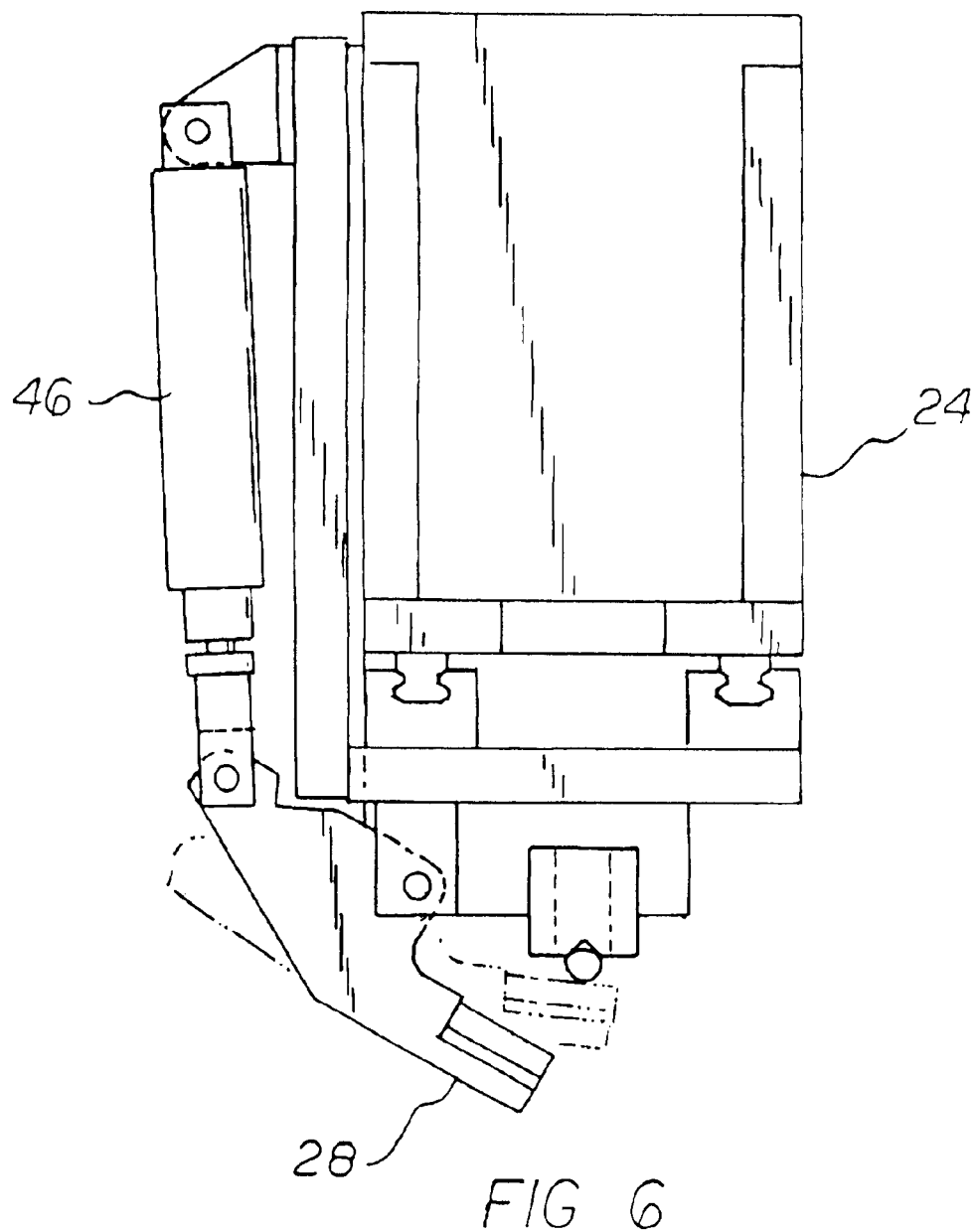
FIG. 6 is a top plan view of the upper block and upper clamp taken along line 6—6 of FIG. 4.

Further provided is a lower clamp drive 48. The lower clamp drive moves the lower clamp 32 between a locking location and an unlocking location. The locking location is adjacent to the lower block 30 for holding the lower plant prior to and during a cut. The unlocking location is remote from the lower block 30 after grafting. Note FIGS. 4 and 5 as well as FIG. 6.

Last provided is an operator control assembly. The operator control assembly includes first button 52. This button activates the upper clamp drive 46 and the upper clamp 28 from the unlocking position to the locking position. A second button 50 is provided. The second button activates the lower clamp drive 40 and the lower clamp 32 from the unlocking position and locking position. Also provided are third and fourth buttons 58, 60 to be depressed simultaneously to sequentially and automatically drive the first horizontal drive cylinder 38 and the cutter assembly 14 to the cut position and return to the rest position, to engage the pneumatic activator 44 then to drive the second horizontal drive cylinder 40 and the intermediate block 34 between a rest location and a remote location, and then to drive the vertical drive cylinder 42 and the upper block 26 and clamp 28 between a raised position and a lowered position thereby joining the two plants and finally releasing the clamps.

The electrical box has two lights on the upper surface, a green light and a red light. The red light when illuminated is a signal that the power is on. When both clamps are properly engaged, the green light is illuminated indicating that the buttons 58, 60 may be depressed simultaneously to begin the automatic cycle of operation. Note FIG. 1.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant grafting system for coupling the upper portion of a lower plant with the lower portion of an upper plant comprising, in combination:

a work table having an upper horizontal surface for the receipt and retention of various components of the system;

a cutter assembly positioned on the work surface having a cutter support with a pair of V-shaped upper razors and a pair of V-shaped lower razors and a spring-biased retention finger extending forewardly through a space between the lower razors;

a holder/insertion assembly positioned on the work surface laterally spaced from the cutter assembly to define an operational space there between, the holder assembly including an upper block with an associated upper clamp for retaining the lower portion of the upper plant laterally spaced from the upper razors and a lower block with an associated lower clamp beneath the upper block and upper clamp for holding the upper portion of the lower plant and an intermediate block between the upper and lower block laterally spaced from the lower razors, intermediate member to locate the ends of the plants with respect to the blocks and razors;

a first horizontal drive cylinder to move the cutter assembly and razors laterally between a rest position and a cutting position adjacent to the upper support and intermediate support for cutting a V-shaped recess in the upper portion of the lower plant and a V-shaped projection in the lower portion of the upper plant and for advancing the retention finger to clamp a central portion of the lower plant into contact with the central support prior to cutting, the first horizontal drive cylinder also adapted to retract the cutting assembly away from the blocks after cutting;

a second horizontal drive cylinder to laterally shift the intermediate block between a rest location between the upper and lower blocks for cutting of the plants and a remote location laterally offset from the rest position for coupling of the plants;

a vertical drive cylinder to move the upper block and clamp between a raised position for cutting of the plant and a lowered position whereby the V-shaped projection of the upper plant is in frictional contact with and retained by the V-shaped recess in the upper portion of the lower plant;

pneumatic activator positioned with respect to the intermediate block to create a flow of pressurized air to eject the uppermost portion of the lower plant from the central support after cutting;

an upper clamp drive to move the upper clamp between a locking location adjacent to the upper block for holding the upper plant prior to and during a cut and an unlocking location remote from the upper block after grafting;

a lower clamp drive to move the lower clamp between a locking location adjacent to the intermediate block for holding the lower plant prior to and during a cut and an unlocking location remote from the intermediate block after grafting; and a control assembly including a first button to drive the upper clamp drive and the upper clamp from the unlocking position to the locking position, a second button to drive the lower clamp drive and the lower clamp from the unlocking position and locking position, third and fourth buttons to sequentially and automatically drive the first horizontal drive cylinder and the cutter assembly between the rest position and the cutting position and then to engage the pneumatic actuator, and then to drive the second horizontal drive cylinder and the intermediate block between a rest location and a remote location, and then to drive the vertical drive cylinder and the upper block and clamp between a raised position and a lowered position.

* * * * *